United States Patent
Hoelzl et al.

(10) Patent No.: US 12,180,943 B2
(45) Date of Patent: Dec. 31, 2024

(54) PLAIN BEARING ARRANGEMENT AND NACELLE EQUIPPED WITH A PLAIN BEARING ARRANGEMENT FOR A WIND TURBINE, AND WIND TURBINE

(71) Applicant: Miba Gleitlager Austria GmbH, Laakirchen (AT)

(72) Inventors: Johannes Sebastian Hoelzl, Berg im Attergau (AT); Albert Waldl, Laakirchen (AT); Patrick Laubichler, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 18/029,711

(22) PCT Filed: Oct. 5, 2021

(86) PCT No.: PCT/AT2021/060360
§ 371 (c)(1),
(2) Date: Mar. 31, 2023

(87) PCT Pub. No.: WO2022/073050
PCT Pub. Date: Apr. 14, 2022

(65) Prior Publication Data
US 2023/0228253 A1 Jul. 20, 2023

(30) Foreign Application Priority Data
Oct. 7, 2020 (DE) .................... 10 2020 126 284.1

(51) Int. Cl.
*F03D 80/70* (2016.01)
*F03D 1/06* (2006.01)
(Continued)

(52) U.S. Cl.
CPC .......... *F03D 80/70* (2016.05); *F03D 1/0691* (2013.01); *F16C 17/02* (2013.01); *F16C 33/046* (2013.01);
(Continued)

(58) Field of Classification Search
CPC .... F16C 17/10; F16C 17/105; F16C 2360/31; F16C 23/043; F16C 33/046; F03D 80/70
See application file for complete search history.

(56) References Cited

U.S. PATENT DOCUMENTS

| 4,105,261 A | * | 8/1978 | Myers | ................. F16C 35/02 384/208 |
| 4,138,166 A | | 2/1979 | Riegler et al. | |

(Continued)

FOREIGN PATENT DOCUMENTS

| DE | 650737 C | 9/1937 |
| DE | 678930 C | 7/1939 |

(Continued)

OTHER PUBLICATIONS

International Search Report in PCT/AT2021/060360, mailed Feb. 1, 2022.

*Primary Examiner* — Justin D Seabe
(74) *Attorney, Agent, or Firm* — Collard & Roe, P.C.

(57) ABSTRACT

A sliding bearing includes an inner ring element; an outer ring element; and at least one sliding bearing element, which is arranged between the inner ring element and the outer ring element, wherein the sliding bearing element includes at least two sliding bearing pads, wherein the individual sliding bearing pads each have a bearing surface, which has the basic shape of a spherical cap.

23 Claims, 10 Drawing Sheets

Figure 1:
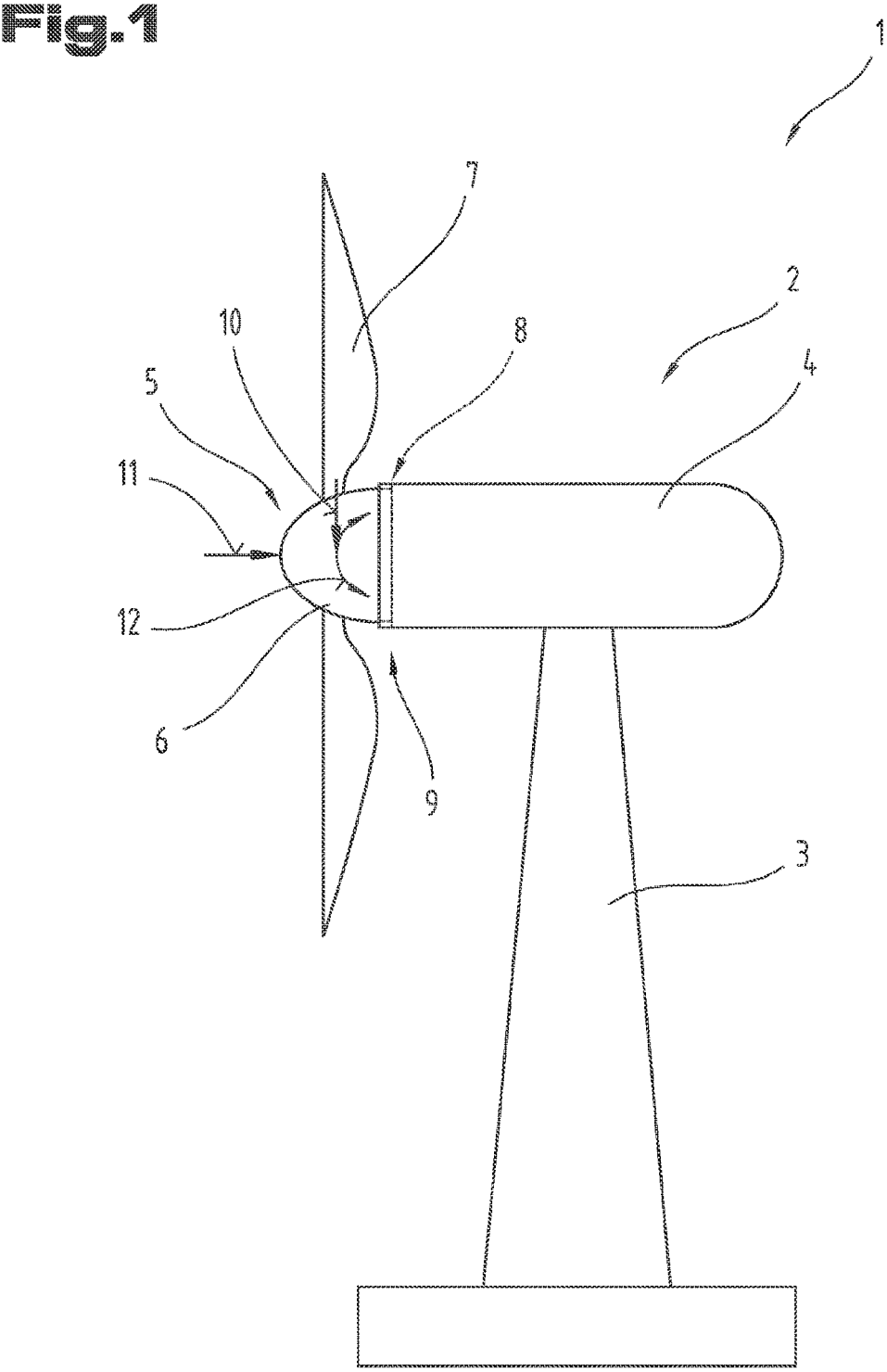

(51) Int. Cl.
*F16C 17/02* (2006.01)
*F16C 17/10* (2006.01)
*F16C 33/04* (2006.01)

(52) U.S. Cl.
CPC ....... *F05B 2240/53* (2013.01); *F05B 2240/57* (2013.01); *F05B 2260/98* (2013.01); *F16C 2360/31* (2013.01)

(56) References Cited

U.S. PATENT DOCUMENTS

| | | | |
|---|---|---|---|
| 7,675,211 B2 * | 3/2010 | Dimascio | F03D 80/70 310/90 |
| 9,458,880 B2 | 10/2016 | Kari et al. | |
| 9,758,231 B2 * | 9/2017 | Kluge | F16C 33/121 |
| 2008/0218006 A1 | 9/2008 | Dimascio et al. | |
| 2022/0145862 A1 | 5/2022 | Holzinger et al. | |

FOREIGN PATENT DOCUMENTS

| | | | | |
|---|---|---|---|---|
| DE | 826807 | C | 1/1952 | |
| DE | 28 00 038 | A1 | 7/1978 | |
| DE | 10305511 | B3 * | 9/2004 | ........... B21B 31/074 |
| DE | 10 2019 102 430 | A1 | 8/2020 | |
| EP | 2 426 050 | A2 | 3/2012 | |
| FR | 1464065 | A | 7/1966 | |
| GB | 401850 | A | 11/1933 | |
| GB | 2273746 | A | 6/1994 | |
| JP | S37-1706 | U | 2/1962 | |
| JP | H05-96545 | U | 12/1993 | |
| JP | 2006-7887 | A | 1/2006 | |
| JP | 2009-192003 | A | 8/2009 | |
| JP | 2012-159171 | A | 8/2012 | |
| JP | 2016-63547 | A | 4/2016 | |
| JP | 2001-107953 | A | 4/2021 | |
| WO | 2011/127510 | A1 | 10/2011 | |
| WO | 2013/043917 | A2 | 3/2013 | |
| WO | 2015/184022 | A1 | 12/2015 | |
| WO | 2020/176919 | A1 | 9/2020 | |

* cited by examiner

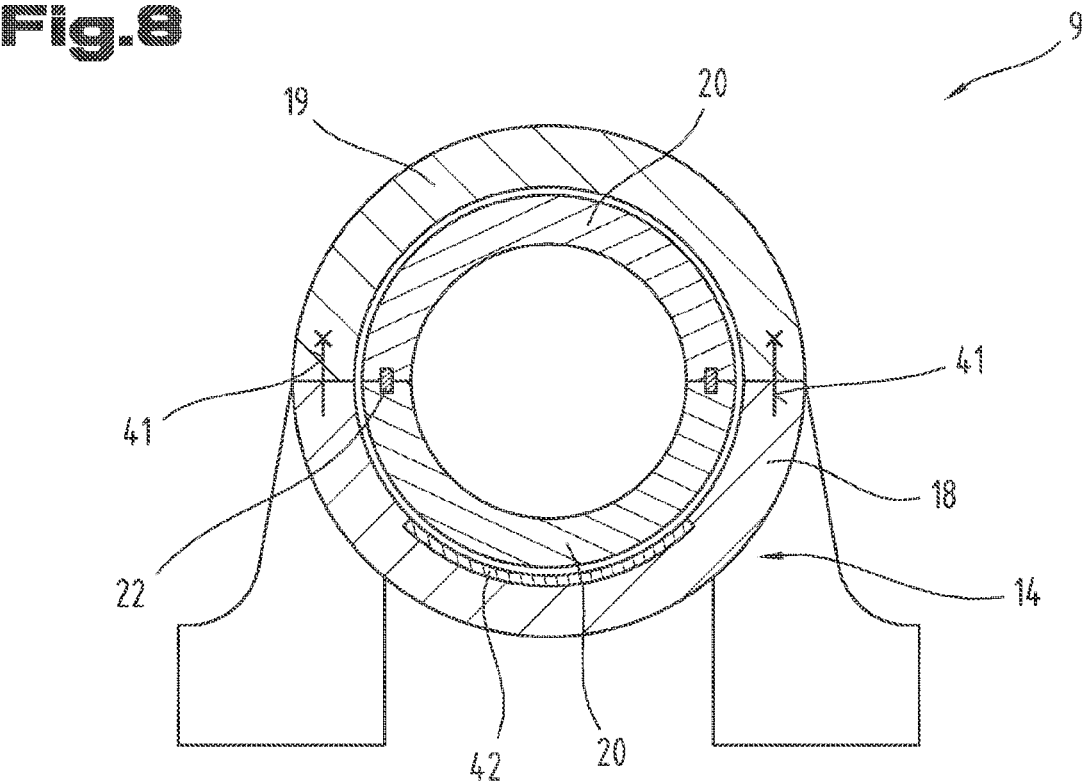

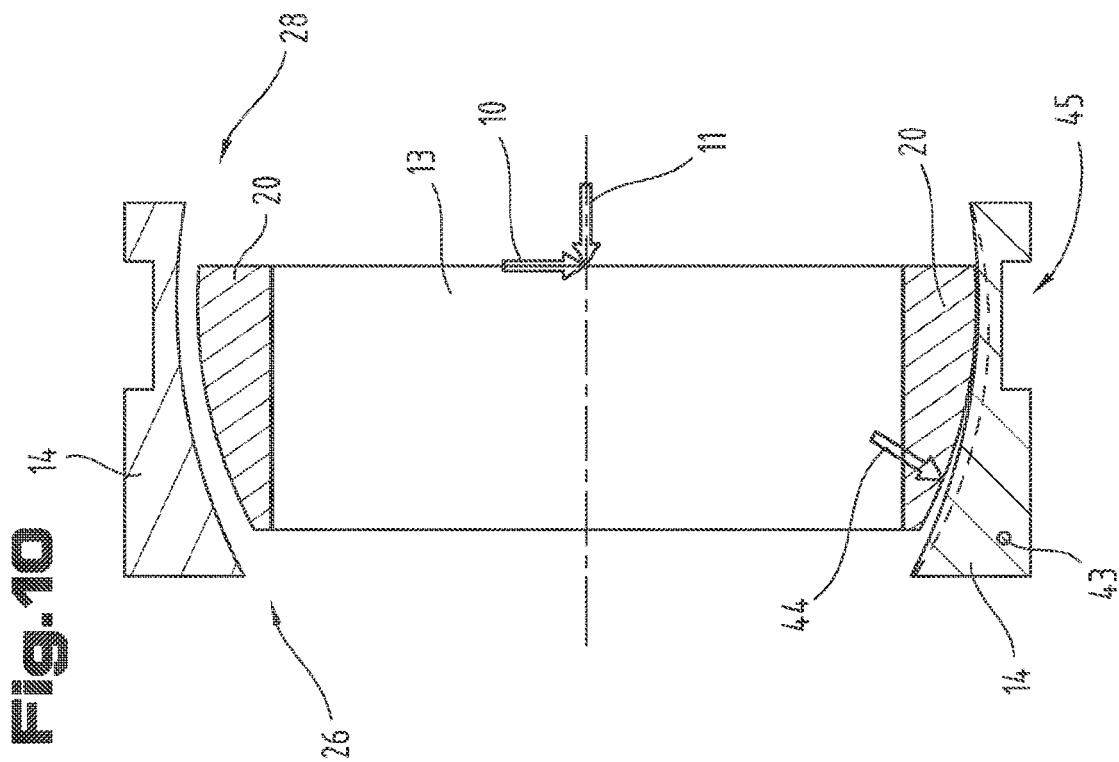
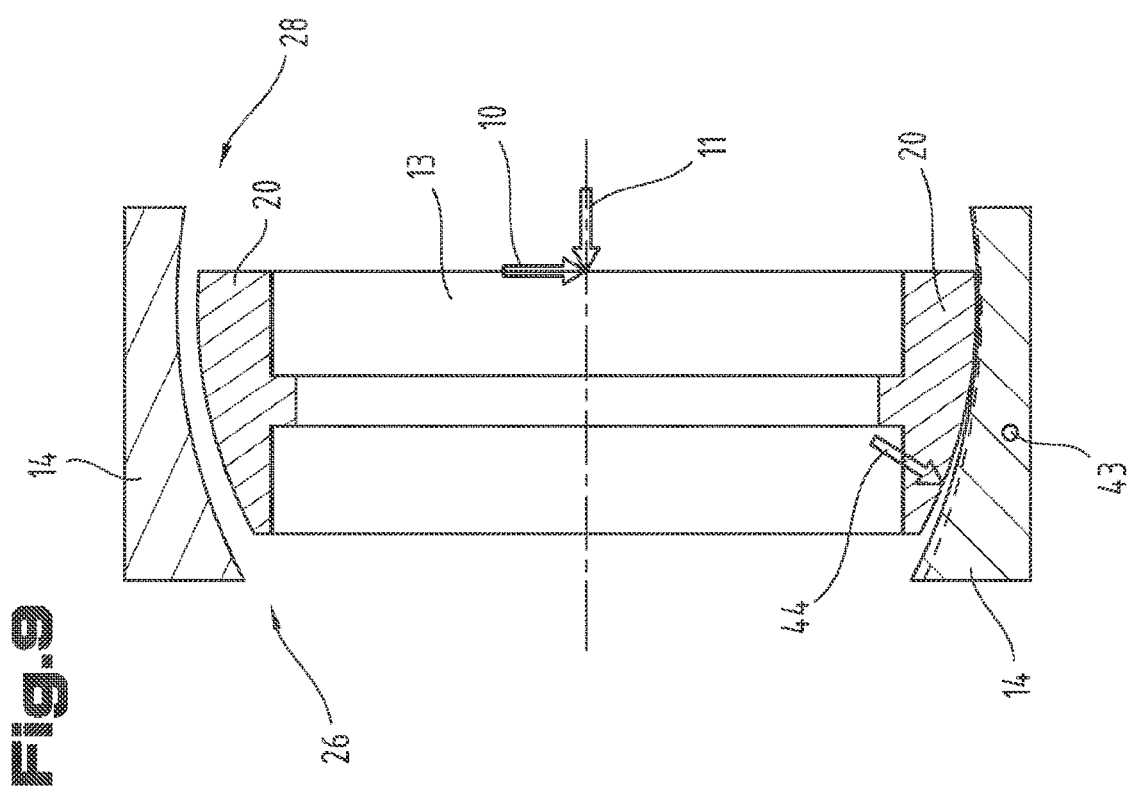

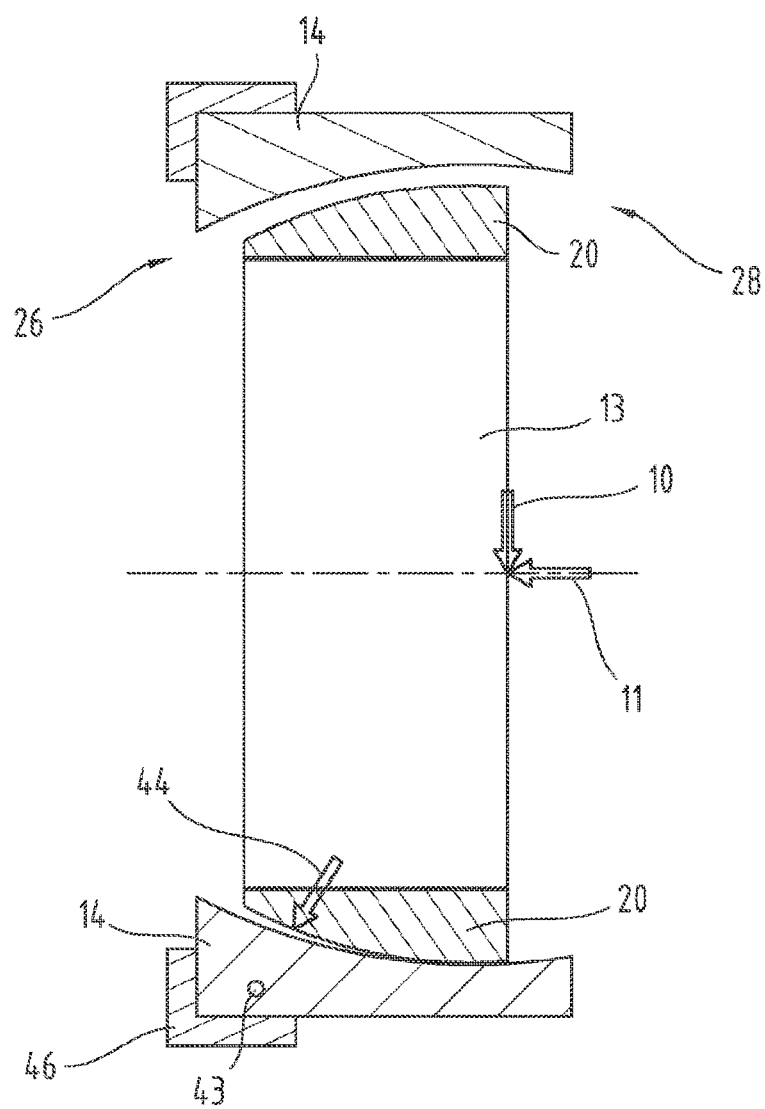

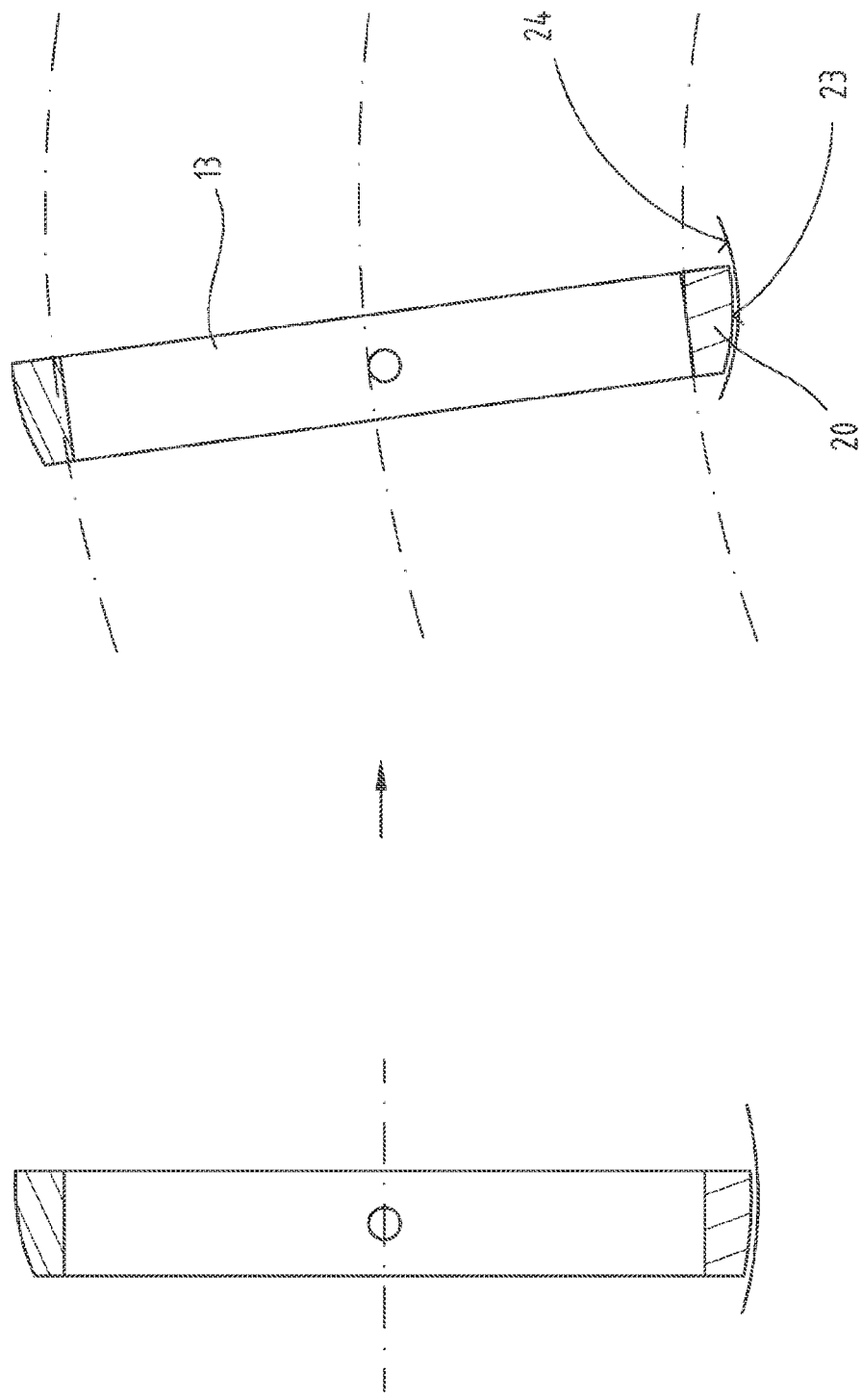

PLAIN BEARING ARRANGEMENT AND NACELLE EQUIPPED WITH A PLAIN BEARING ARRANGEMENT FOR A WIND TURBINE, AND WIND TURBINE

CROSS REFERENCE TO RELATED APPLICATIONS

This application is the National Stage of PCT/AT2021/060360 filed on Oct. 5, 2021, which claims priority under 35 U.S.C. § 119 of German Application No. 10 2020 126 284.1 filed on Oct. 7, 2020, the disclosure of which is incorporated by reference. The international application under PCT article 21 (2) was not published in English.

The invention relates to a sliding bearing and a nacelle equipped with a sliding bearing for a wind turbine, and to a wind turbine.

A bearing element for bearing the rotor hub of a wind turbine is known from WO 2011/127510 A1.

The object of the present invention was to provide an improved sliding bearing.

This object is achieved by a device according to the claims.

According to the invention, a sliding bearing is formed. The sliding bearing comprises:
an inner ring element;
an outer ring element;
at least one sliding bearing element, which is arranged between the inner ring element and the outer ring element,
wherein the sliding bearing element comprises at least two sliding bearing pads, wherein the individual sliding bearing pads each have a bearing surface, which has the basic shape of a spherical cap.

The sliding bearing according to the invention entails the advantage that the bearing surface, which may have the basic shape of a spherical cap, is configured to absorb radial forces and, at the same time, to absorb axial forces.

Moreover, it may be useful if the outer ring element is configured as a bearing block, which comprises a bearing block base and a bearing block cover. This entails the advantage that the bearing block cover can be easily removed, whereby a simple removal of the sliding bearing pads can be achieved in case of maintenance. In particular, by this measure, the sliding bearing pads can be removed from the inner ring element radially. In addition, this measure allows the individual sliding bearing pads to be arranged on the inner ring element in a simplified manner during assembly of the sliding bearing by lifting them radially through the opening of the bearing block cover into the intermediate space between the inner ring element and the outer ring element. In particular, it may be provided that, during operation of the sliding bearing, the outer ring element stands still and that the sliding bearing pads are attached to the inner ring element and are rotated together with the inner ring element.

Furthermore, it may be provided that the bearing surface cooperates with the outer ring element, wherein a counterface to the bearing surface is formed in the outer ring element. This entails the advantage that the sliding surface and/or also the counterface can be manufactured easily.

In addition, it may be provided that the inner ring element has a shaped element, in particular in the form of an elevation or an indentation, wherein the sliding bearing pads have a mating shaped element corresponding to the shaped element, such that the shaped element serves as an axial securing means for the sliding bearing pads. This entails the advantage that the individual sliding bearing pads can be held on the inner ring element by the shaped element such that they cannot be displaced in the axial direction. In other words, the shaped element and/or the mating shaped element may serve for transferring axial forces from the sliding bearing pads onto the inner ring element.

An embodiment, according to which it may be provided that the shaped element arranged on the inner ring element is configured in the form of a circumferential bead with a rectangular cross-section, wherein the sliding bearing pads comprise a corresponding groove extending in the circumferential direction, is also advantageous. High axial forces can be transferred in particular by the formation of such a circumferential bead.

In an alternative embodiment variant, it may be provided that a groove with a rectangular cross-section is formed on the inner ring element, wherein the sliding bearing pads have a corresponding elevation and/or a bead on their inner side. This entails the advantage that such a circumferential groove is easy to produce on the inner ring element. A bead is also easy to produce in the sliding bearing pad.

Furthermore, it may be provided that at least one of the sliding bearing pads is provided with an anti-rotation means by means of which this sliding bearing pad is secured against rotation relative to the inner ring. Such an anti-rotation means may be, for example, an elevation, an indentation or also another element acting in a positive locking manner between the sliding bearing pad and the inner ring element, such as a driving pin.

According to an advancement, it is possible for at least individual ones of the sliding bearing pads to be coupled to one another by means of a connecting element. This entails the advantage that the individual sliding bearing pads can be fixed relative to one another. Thus, the position of the individual sliding bearing pads can be fixed.

Furthermore, it may be useful if the connecting element is arranged on a circumferential side of the sliding bearing pads. Particularly with a connecting element configured in this way, the individual sliding bearing pads can be fixed well with respect to one another.

Moreover, it may be provided for the connecting element to have at least one fastening wedge, wherein a fastening groove corresponding to the fastening wedge is formed in the sliding bearing pad. A connecting element, which is equipped with a fastening wedge, may serve not only for absorbing shear forces but also for absorbing pulling forces.

Furthermore, it may be provided that the connecting element comprises an adjusting means, such that the distance to one another of two sliding bearing pads coupled to one another by means of the connecting element may be adjusted. This entails the advantage that the individual sliding bearing pads may be tensioned with respect to one another and thus clamped to the inner ring element.

According to a particular embodiment, it is possible that at least individual ones of the sliding bearing pads are coupled to the inner ring element by means of a fastening means. This entails the advantage that the sliding bearing pads may be firmly connected to the inner ring element, wherein this connection may be configured so as to be detachable. In particular, it may be provided that fastening screws are used as the fastening means. Furthermore, it may be provided that the fastening means may be inserted in the radial direction into the sliding bearing pads and/or into the inner ring element. In particular, it may be provided that through holes are formed in the sliding bearing pads through which the fastening screws can engage in threaded holes which can be arranged in the inner ring element.

According to an advantageous advancement, it may be provided that the bearing surface has a spherical cap formed in such a way that the bearing surface has a first diameter in the region of a first end face of the sliding bearing pad and that the bearing surface has a second diameter in the region of a second end face of the sliding bearing pad, wherein the first diameter is smaller than the second diameter and wherein the second diameter forms the largest diameter on the bearing surface. In other words, it may be provided that the bearing surface is configured so as to taper starting from the second diameter, wherein this taper may be configured in the form of a spherical cap. This entails the advantage that the sliding bearing pads are particularly well configured for absorbing forces in a first axial direction, in particular in a main load direction.

In particular, it may be advantageous if an axial bearing ring is formed which is coupled to the outer ring element, wherein an axial sliding surface is formed on the sliding bearing pads, wherein an axial counter-sliding surface, which corresponds to the axial sliding surface, is formed on the axial bearing ring. It may be provided that the axial bearing ring is arranged on that side of the sliding bearing in which the lower axial forces occur compared to the second side.

It may also be provided that the outer ring element comprises a recess and/or a stiffening which serves to change the position of a shear center of the outer ring element. This entails the advantage that the deformation of the outer ring element, which is caused due to the force effect on the sliding bearing, may be influenced. Hence, the surface pressure occurring due to the load may be reduced and/or shifted by this measure.

Furthermore, it may be provided that the counterface of the outer ring element and/or the bearing surfaces of the sliding bearing pads have a shape deviating from an ideal spherical cap by between 0.001 mm and 10 mm, in particular between 0.05 mm and 5 mm, preferably between 0.5 mm and 1 mm, which shape is configured such that load-induced deformations of the inner ring element and/or the outer ring element and/or the sliding bearing pad are compensated and, in the loaded state, the bearing surfaces of the sliding bearing pads lie flat against the counterface of the outer ring element. This entails the advantage that a load-induced deformation of individual components of the sliding bearing may be anticipated by this measure, such that in operation the bearing surface and the counterface lie as flat as possible against each other in order to prevent surface pressure.

An embodiment according to which it may be provided that the sliding bearing is formed as a hydrodynamic sliding bearing is also advantageous. Particularly a hydrodynamic sliding bearing has a lower friction resistance and thus a high efficiency.

Furthermore, it may be provided that at least one driving recess for conveying lubricating oil is formed on the bearing surface of at least one of the sliding bearing pads. This entails the advantage that lubricating oil may be conveyed upwards from the lubricating oil sump by means of the driving recess and may thus serve to lubricate the sliding bearing. In particular, it may be provided that the driving recess is configured in the form of a groove or a beading.

Furthermore, it is conceivable that a porous material, which serves to temporarily hold lubricating oil, is arranged in the driving recess. This may be a sponge, for example.

Furthermore, it is also conceivable that the driving recess has an opening which is inclined in the direction of rotation and has a cavity for receiving the lubricating oil. In other words, the driving recess may be configured according to the scoop wheel principle. This entails the advantage that lubricating oil can be conveyed upwards from the lubricating oil sump particularly well.

In addition to this, it may be provided that the counterface of the outer ring element has an inlet groove extending over a certain circumferential angle, such that lubricating oil may easily enter the driving recess.

In particular, it may be provided that the driving recess does not extend over the complete axial extent of the sliding surface of the sliding bearing pad, such that the lubricating oil received cannot leak out of the driving recess at the end face.

It may also be provided that a first labyrinth seal is formed in the axial bearing ring and/or that a second labyrinth seal is formed in a sealing ring. In particular, it may be provided that the axial bearing ring is arranged on the second end face of the sliding bearing pad and that the sealing ring is arranged on the first end face of the sliding bearing pad. The provision of labyrinth seals entails the advantage that these can compensate for the relatively large displacements of the shaft in a low one-digit millimeter range.

According to an advancement, it is possible that the bearing block base and the bearing block cover are divided such that a separation gap between the bearing block base and the bearing block cover is arranged at a distance from a load transfer zone. This entails the advantage that the counterface in the region of the load transfer zone does not have a gap, which can improve the smoothness and thus the efficiency of the sliding bearing.

According to the invention, a nacelle for a wind turbine is formed. The nacelle comprises:
- a nacelle housing;
- a rotor shaft;
- a rotor hub, which is arranged on the rotor shaft;
- a rotor bearing for bearing the rotor shaft on the nacelle housing. The rotor bearing comprises a sliding bearing according to one of the preceding embodiments. A nacelle formed in this manner exhibits a high efficiency and a simple construction.

Furthermore, it may be provided that the rotor shaft forms the inner ring element. In particular, a nacelle constructed in this way may be manufactured simply and thus inexpensively.

Furthermore, it may be provided that the bearing surface is configured in the form of a spherical calotte in such a way that the bearing surface has a first diameter in the region of a first end face of the sliding bearing pad and that the bearing surface has a second diameter in the region of a second end face of the sliding bearing pad, wherein the first diameter is smaller than the second diameter and wherein the second diameter forms the largest diameter on the bearing surface, wherein the second end face faces a rotor hub. In other words, it may be provided that the bearing surface is configured so as to taper starting from the second diameter, wherein this taper may be configured in the form of a spherical cap. This entails the advantage that the sliding bearing pads are particularly well configured for absorbing forces in a first axial direction, in particular in a main load direction.

According to the invention, a wind turbine with a nacelle is formed, wherein the nacelle comprises the following components:
- a nacelle housing;
- a rotor hub with rotor blades arranged thereon;
- a rotor bearing for bearing the rotor hub on the nacelle housing. The rotor bearing comprises a sliding bearing according to one of the preceding embodiments. A wind turbine formed in this manner exhibits a high efficiency and a simple construction.

Moreover, it may be provided that the outer ring element has a shear center and that the sliding bearing pad acts on the outer ring element in a main direction of force, wherein the main direction of force acts closer to the second end face of the sliding bearing pad than where the shear center is formed. This entails the advantage that the deformation of the outer ring element, which is caused due to the force effect on the sliding bearing, may be influenced. Hence, the surface pressure occurring due to the load may be reduced and/or shifted by this measure.

For the purpose of better understanding of the invention, it will be elucidated in more detail by means of the figures below.

Figure 2:
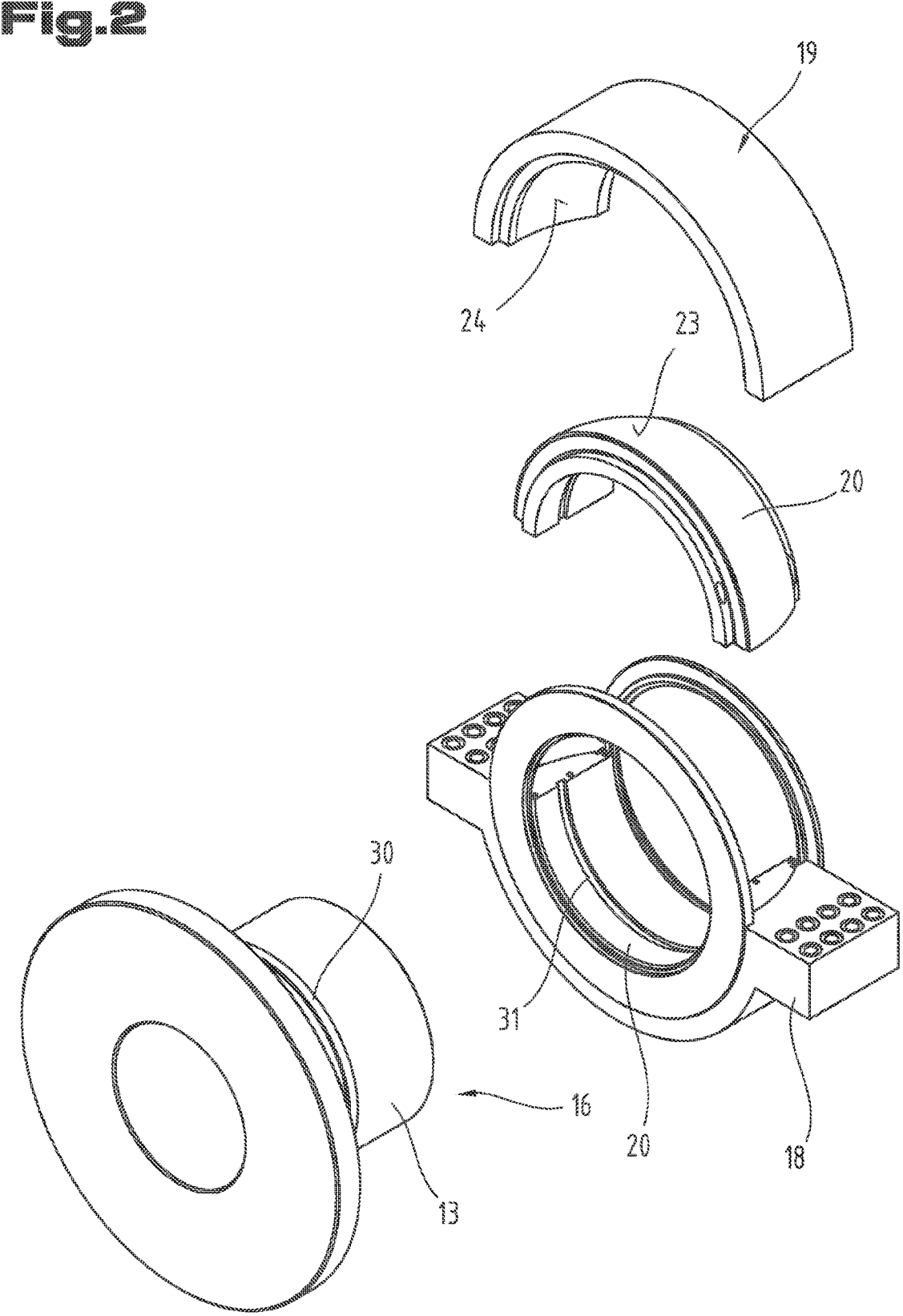
Figure 3:
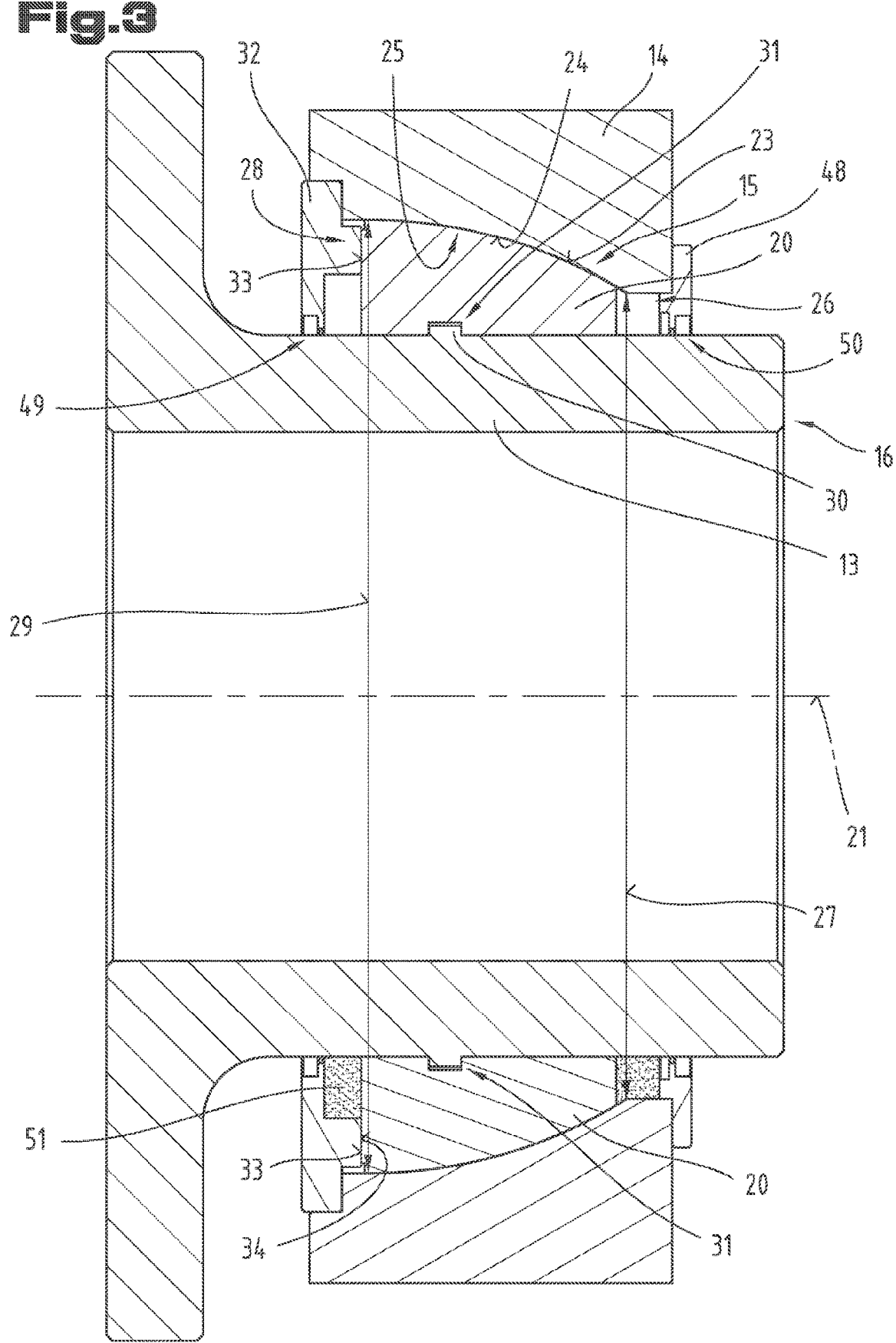
Figure 4:
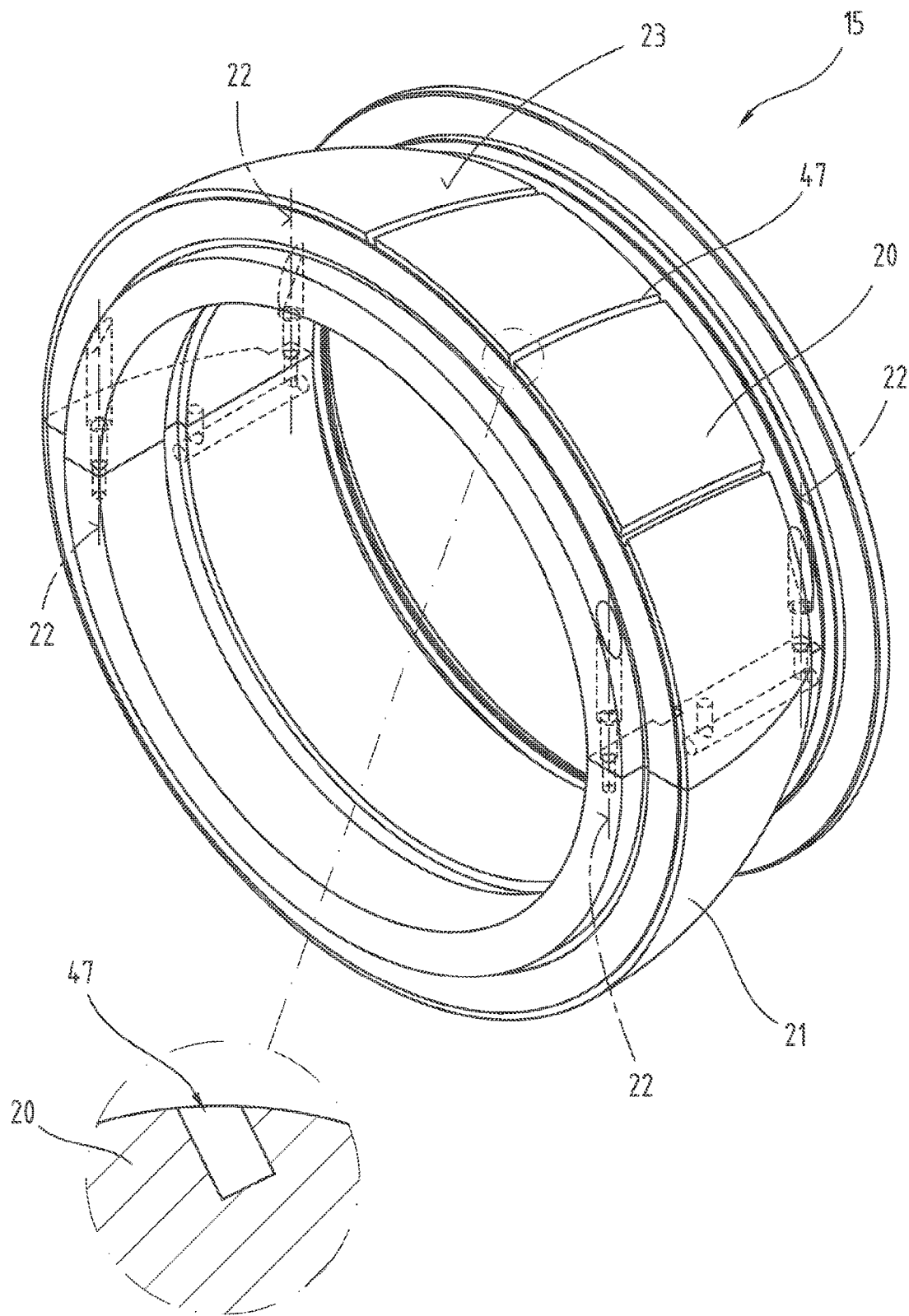
Figure 5:
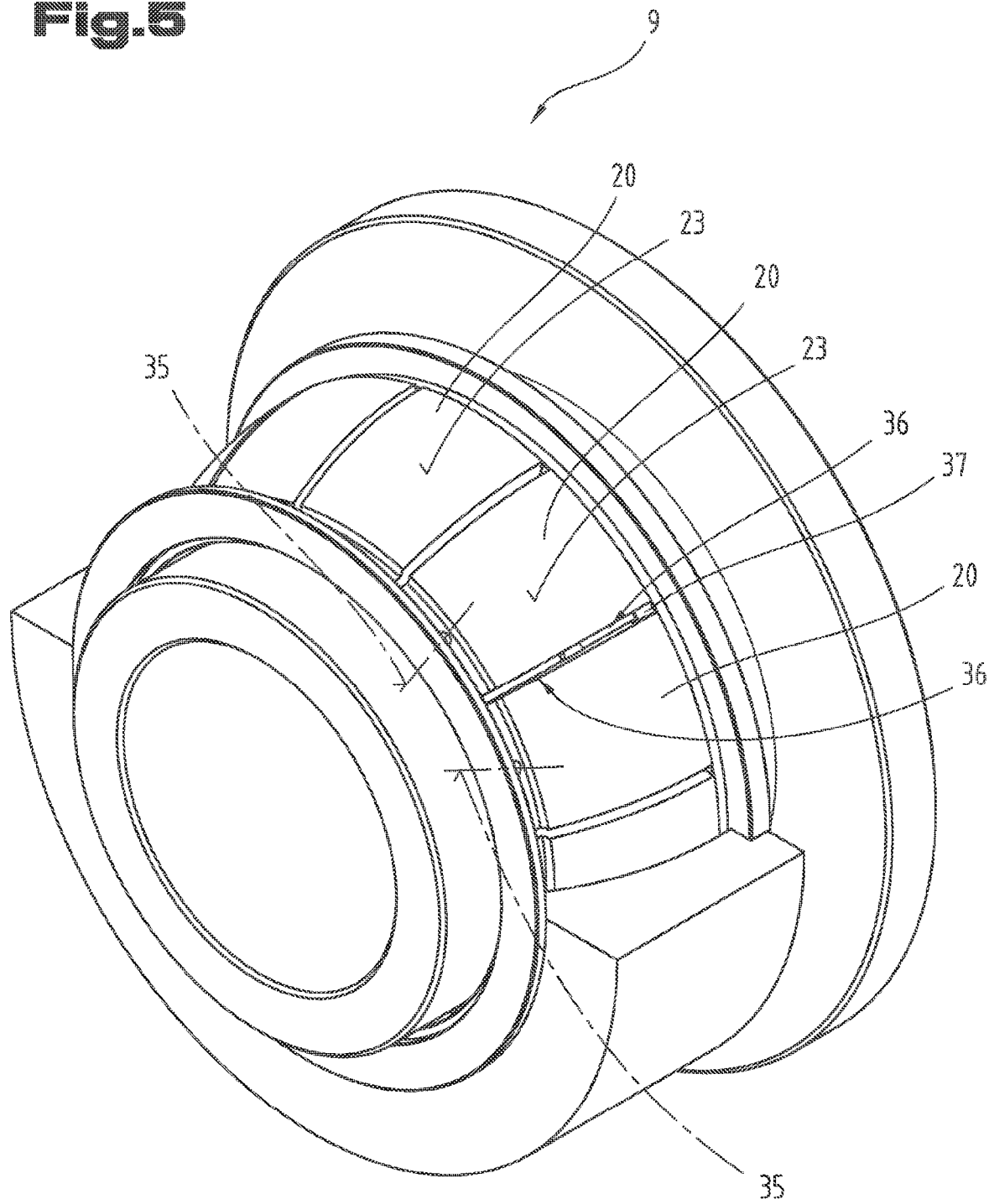
Figure 6:
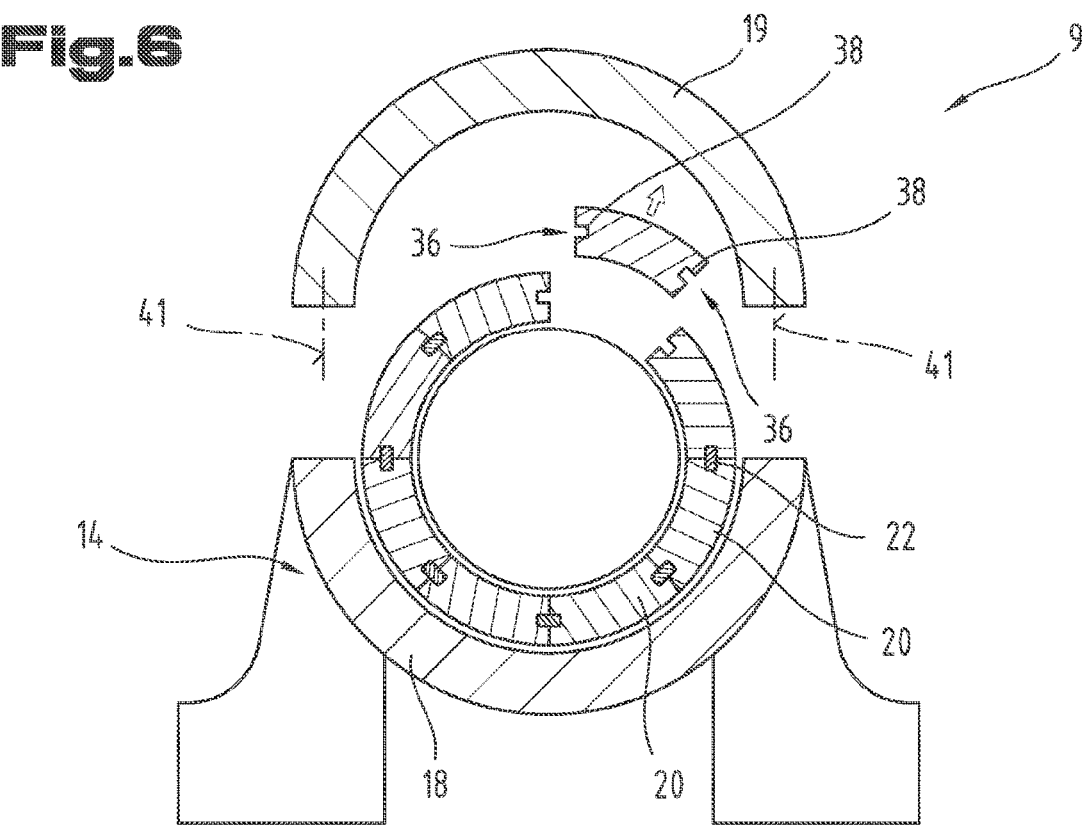
Figure 7:
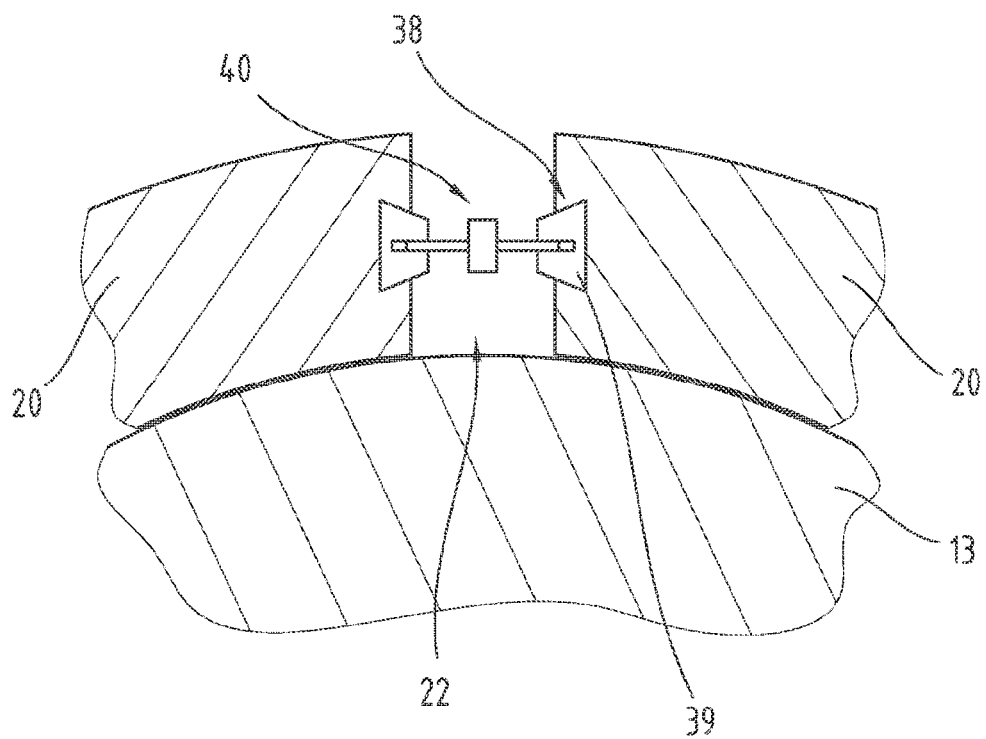

These show in a respectively very simplified schematic representation:

FIG. 1 a schematic representation of a wind turbine;

FIG. 2 a perspective representation of a first exemplary embodiment of a sliding bearing;

FIG. 3 a longitudinal section of the first exemplary embodiment of the sliding bearing;

FIG. 4 a perspective representation of two sliding bearing pads which are configured in the form of sliding bearing half shells;

FIG. 5 a perspective representation of a further exemplary embodiment of the sliding bearing with multiple sliding bearing pads;

FIG. 6 a cross-section of a further exemplary embodiment of the sliding bearing with multiple sliding bearing pads;

FIG. 7 a detail view of a further exemplary embodiment of a connecting element;

FIG. 8 a cross-section of a further exemplary embodiment of the sliding bearing with two sliding bearing pads;

FIG. 9 a longitudinal section of a further exemplary embodiment of the sliding bearing;

FIG. 10 a longitudinal section of a further exemplary embodiment of the sliding bearing with a recess in an outer ring element;

FIG. 11 a longitudinal section of a further exemplary embodiment of the sliding bearing with a stiffening on the outer ring element;

FIG. 12 a further exemplary embodiment of the sliding bearing with a counterface, deviating from the spherical cap, of the outer ring element.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows, in a schematic view, a first exemplary embodiment of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8. In particular, it is provided that a sliding bearing 9 according to the invention and described in more detail below is used as a rotor bearing 8.

The rotor bearing 8, which serves for bearing the rotor hub 6 on the nacelle housing 4 of the nacelle 2, is configured for absorbing a radial force 10 and an axial force 11. The axial force 11 is caused by the force of the wind. The radial force 10 is caused by the weight force of the rotor 5 and is effective at the center of gravity of the rotor 5. As the center of gravity of the rotor 5 is outside the rotor bearing 8, a tilting torque 12 is generated in the rotor bearing 8 by the radial force 10. The tilting torque 12 may also be caused by an uneven load of the rotor blades 7. This tilting torque 12 can be absorbed by means of a second sliding bearing, which is arranged at a distance from the sliding bearing 9 according to the invention.

The rotor bearing 8 according to the invention can have a diameter of 0.5 m to 5 m, for example. Of course, it is also conceivable that the rotor bearing 8 is smaller or larger.

FIG. 2 shows a first exemplary embodiment of the sliding bearing 9 built into the nacelle 2. Of course, the sliding bearing 9 shown in FIG. 2 may also be used in all other industrial applications outside of wind turbines. The sliding bearing 9 is shown in a perspective exploded view in FIG. 2.

FIG. 3 shows the first exemplary embodiment of the sliding bearing 9 in a cross-sectional view.

Below, the sliding bearing 9 will be described by means of a combination of FIGS. 2 and 3.

As can be seen from FIGS. 2 and 3, it may be provided that the sliding bearing 9 comprises an inner ring element 13 and an outer ring element 14. Between the inner ring element 13 and the outer ring element 14, a sliding bearing element 15 is arranged, which serves for the rotatory sliding bearing of the inner ring element 13 relative to the outer ring element 14.

In the exemplary embodiment shown in FIGS. 2 and 3, the inner ring element 13 is configured as a rotor shaft 16. Of course, the inner ring element 13 may also be another shaft.

Furthermore, it may be provided that the outer ring element 14 is configured as a bearing block 17 which comprises a bearing block base 18 and a bearing block cover 19. In particular, it may be provided that the bearing block base 18 is coupled to the nacelle housing 4. In this exemplary embodiment, it may thus be provided that the outer ring element 14 is rigidly coupled to the nacelle housing 4 and that the inner ring element 13 is rotatable about a rotor axis 21 relative to the outer ring element 14 by means of the sliding bearing element 15.

As the rotor shaft 16, which is coupled to the rotor hub 6 and thus to the rotor 5, is received in the inner ring element 13, the rotor shaft 16 is therefore rotatably received in the nacelle housing 4 by means of the sliding bearing 9.

As can further be seen in FIGS. 2 and 3, it may be provided that the sliding bearing element 15 comprises multiple individual sliding bearing pads 20, which are arranged distributed across the circumference, between the inner ring element 13 and the outer ring element 14.

As can be seen in particular from FIG. 3, it may be provided that a first labyrinth seal 49 is formed in the axial bearing ring 32. Furthermore, it may be provided that a second labyrinth seal 50 is formed in a sealing ring 48 which is arranged on the first end face 26.

As can further be seen from FIG. 3, it may be provided that a cavity for receiving lubricating oil 51 is formed between the axial bearing ring 32 and the sliding bearing pad 20 and/or between the sealing ring 48 and the sliding bearing pad 20. This cavity may also be referred to as lubricating oil sump. In particular, it may be provided that the sliding bearing pad 20 has an axially extending opening, which serves for letting lubricating oil into driving recesses 47, in the region of the lubricating oil sump.

FIG. 4 shows an exemplary embodiment of the sliding bearing element 15 in a perspective view. It may be seen particularly well from this representation that it may be provided that the sliding bearing element 15 comprises two individual sliding bearing pads 20. As can further be seen from FIG. 4, it may be provided that the individual sliding bearing pads 20 are coupled to one another by means of a connecting element 22.

As can be seen from FIG. 4, it may be provided that at least one driving recess 47 for conveying the lubricating oil 51 is formed on the bearing surface 23 of at least one of the sliding bearing pads 20.

In particular, it may be provided that the connecting elements 22 are configured in the form of screws. As can further be seen from FIG. 4, it may be provided that the two sliding bearing pads 20 are screwed together in the circumferential direction and/or tangentially. By such screwing, it may be achieved that the inner ring element 13 is clamped by the sliding bearing pads 20.

In the operating state of the sliding bearing 9, the individual sliding bearing pads 20 are thus fixedly connected to the inner ring element 13 due to the structure described and thus, rotate along with it relative to the outer ring element 14. In order to enable the rotational movement between the inner ring element 13 and the outer ring element 14, on each of the individual sliding bearing pads 20 one bearing surface 23 is formed which abuts on a counterface 24 of the outer ring element 14 in the operational state of the sliding bearing 9. The counterface 24 is arranged on the inside 25 of the outer ring element 14.

The bearing surface 23 of the sliding bearing pad 20 and the counterface 24 of the outer ring element 14 are designed as sliding surfaces, which slide on one another during operation of the sliding bearing 9. In particular, it may be provided that the counterface 24 of the outer ring element 14 is designed as a hard, wear-resistant surface, which may be formed, for example, by a hardened steel. The bearing surface 23 of the sliding bearing pad 20 may be formed of a sliding bearing material which is soft in comparison to the counterface 24. Of course, it is also conceivable that the bearing surface 23 has an anti-friction coating.

As can be seen particularly well in FIG. 3, the bearing surface 23 may be configured in the form of a spherical cap. Designing the bearing surface 23 and/or the counterface 24 in the shape of a spherical cap entails the advantage that the sliding bearing pads 20 can be rotated easily about the rotor axis 21. At the same time, the sliding bearing pads 20 can be tilted about an angle with respect to the longitudinal extension of the rotor axis 21. By means of the described embodiment of a spherical cap, bending of the rotor shaft 16 can thus be compensated in the sliding bearing 9 without an increased area load occurring on the bearing surface 23 in the process.

Moreover, due to the design of the bearing surface 23 and/or the counterface 24 in the shape of a spherical cap, axial bearing forces can also be transferred in addition to the transfer of radial bearing forces.

As can further be seen in FIG. 3, it may be provided that the bearing surface 23 has a first diameter 27 on a first end face 26. Starting from this first end face 26, the bearing surface 23 may have an increase in diameter towards a second end face 28. In the area of the second end face 28, in particular towards the rotor hub, the bearing surface 23 may be configured to be open and have a second diameter 29 there. This embodiment of the bearing surface 23 allows the axial force 11 and also the radial force 10 to be absorbed particularly well.

As can further be seen from FIG. 3, it may be provided that a shaped element 30 in the form of a circumferential bead is formed on the inner ring element 13. As a counterpart, a mating shaped element 31 in the form of an indentation may be formed in the sliding bearing pad 20 on the side facing the inner ring element 13.

As can further be seen from FIG. 3, it may be provided that an axial bearing ring 32 is formed in the region of the second end face 28, which may be coupled, in particular screwed, to the outer ring element 14. In particular, it may be provided in this regard that an axial sliding surface 33 is formed on the sliding bearing pads 20, wherein an axial counter-sliding surface 34, which corresponds to the axial sliding surface 33, is formed on the axial bearing ring 32. The axial bearing ring 32 may thus stand still together with the outer ring element 14 and the sliding bearing pad 20 may rotate relative to the axial bearing ring 32.

FIG. 5 shows a further and possibly independent embodiment of the sliding bearing 9, wherein again, equal reference numbers and/or component designations are used for equal parts as in FIGS. 1 through 4 above. In order to avoid unnecessary repetitions, it is pointed to/reference is made to the detailed description in FIGS. 1 through 4 preceding it.

As can be seen from FIG. 5, it may be provided that multiple ones of the sliding bearing pads 20 are arranged being distributed across the circumference. The individual sliding bearing pads 20 may be coupled to the inner ring element 13 by means of fastening means 35. In particular, it may be provided that the fastening means 35 are configured in the form of screws.

As can further be seen from FIG. 5, it may be provided that the individual sliding bearing pads 20, as seen in the circumferential direction, are arranged at a distance from one another, such that the individual circumferential sides 36 of the individual sliding bearing pads 20 are arranged at a distance from one another. This way, a gab 37, which may serve for receiving and conveying lubricating oil, may be formed.

FIG. 6 shows a further and possibly independent embodiment of the sliding bearing 9, wherein again, equal reference numbers and/or component designations are used for equal parts as in FIGS. 1 through 5 above. In order to avoid unnecessary repetitions, it is pointed to/reference is made to the detailed description in FIGS. 1 through 5 preceding it.

As can be seen from FIG. 6, it may be provided that the individual sliding bearing pads 20 are held in position relative to one another by means of the connecting element 22. As can be seen from FIG. 6, it may be provided that the connecting element 22 is arranged on the circumferential side 36 of the sliding bearing pads 20.

As can further be seen from FIG. 6, it may be provided that the bearing block cover 19 is fastened to the bearing block base 18 by means of fastening means 41.

In a first exemplary embodiment, it may be provided that the connecting element 22 is configured in the form of a rectangular rod which is introduced into a fastening groove 38 arranged in the circumferential sides 36. As can be seen from FIG. 6, it may be provided for changing the individual sliding bearing pads 20 that the bearing block cover 19 is lifted off the bearing block base 18 in a first method step. Subsequently, the connecting elements 22 of the sliding bearing pad 20 to be changed may be removed. In a further method step, the sliding bearing pad 20 to be changed can be taken out of its position in a radial direction and be removed.

FIG. 7 shows a further and possibly independent embodiment of the sliding bearing 9, wherein again, equal reference numbers and/or component designations are used for equal parts as in FIGS. 1 through 6 above. In order to avoid unnecessary repetitions, it is pointed to/reference is made to the detailed description in FIGS. 1 through 6 preceding it.

FIG. 7 in particular shows a detail view of the connecting element 22 for connecting adjacent sliding bearing pads 20. As can be seen from FIG. 7, it may be provided that the fastening groove 38 in the sliding bearing pads 20 is configured wedge-shaped and that, correspondingly thereto, the connecting element 22 comprises a fastening wedge 39 which is received in the fastening groove 38. A further fastening wedge 39 of the connecting element 22 may be received in the fastening groove 38 of the further sliding bearing pad 20.

As can further be seen from FIG. 7, it may be provided that the connecting element 22 comprises an adjusting means 40 by means of which the distance of the two fastening wedges 39 to one another is adjustable. Hence, by means of the adjusting means 40, the distance of adjacent sliding bearing pads 20 may be adjusted. In particular, it may be achieved by this measure that the sliding bearing pads 20 are pressed against the inner ring element 13.

FIG. 8 shows a further and possibly independent embodiment of the sliding bearing 9, wherein again, equal reference numbers and/or component designations are used for equal parts as in FIGS. 1 through 7 above. In order to avoid unnecessary repetitions, it is pointed to/reference is made to the detailed description in FIGS. 1 through 7 preceding it.

FIG. 8 show the further exemplary embodiment of the sliding bearing 9 in a sectional view. As can be seen from FIG. 8, it may be provided that two sliding bearing pads 20 are formed which are coupled to one another by means of the connecting elements 22. FIG. 8 schematically shows a load transfer zone 42 in which the bearing surface 23 of the sliding bearing pad 20 contacts and lies against the counterface 24 of the outer ring element 14, in particular the bearing block base 18. Due to gravity, in the present exemplary embodiment, the load transfer zone 42 is formed around the deepest point of the counterface 24 of the outer ring element 14. As can be seen from FIG. 8, it may be provided that the counterface 24 of the outer ring element 14 is not divided in the region of the load transfer zone 42 and thus does not have a gab.

FIGS. 9 to 11 each show a further and possibly independent embodiment of the sliding bearing 9, wherein again, equal reference numbers and/or component designations are used for equal parts as in FIGS. 1 to 8 above. In order to avoid unnecessary repetitions, it is pointed to/reference is made to the detailed description in FIGS. 1 through 8 preceding it.

As can be seen from FIG. 9, the outer ring element 14 has a shear center 43. The vector sum of the radial force 10 and the axial force 11 yields a main direction of force 44 in which the sliding bearing pads 20 act on the outer ring element 14.

As can be seen from FIG. 9, in a simply configured outer ring element 14, the main direction of force 44 may be arranged closer to the first end face 26 than the shear center 43. This results in that in case of a load on the outer ring element 14 by a force acting in the main direction of force 44, the outer ring element 14 is pushed outwards in the region of the first end face 26. However, this deformation may be undesirable.

Therefore, it is conceivable that, as shown in FIG. 10, that a recess 45, by which the shear center 43 of the outer ring element 14 may be displaced, is formed in the outer ring element 14.

FIG. 11 shows an alternative embodiment variant in which a stiffening 46, by means of which the shear center 43 may also be displaced, is arranged and/or formed on the outer ring element 14.

In a preferred embodiment variant, the shear center 43 is influenced such by means of the recess 45 and/or the stiffening 46 that the main direction of force 44 is arranged so as to be positioned precisely in the shear center 43.

FIG. 12 shows a further and possibly independent embodiment of the sliding bearing 9, wherein again, equal reference numbers and/or component designations are used for equal parts as in FIGS. 1 through 11 above. In order to avoid unnecessary repetitions, it is pointed to/reference is made to the detailed description in FIGS. 1 through 11 preceding it.

As can be seen from FIG. 12, it may be provided that the counterfaces 24 of the outer ring element 14 and/or the bearing surfaces 23 of the sliding bearing pads 20 have a shape deviating from the ideal spherical cap shape by a correction value. By this measure, it may be achieved that load-induced deformations of the inner ring element 13 and/or the outer ring element 14 and/or the sliding bearing pad 20 may be compensated for, such that in the loaded state, the bearing surfaces 23 of the sliding bearing pads 20 lie against the counterface 24 of the outer ring element 14 over as large an area as possible. Thereby, the surface pressure may be kept as low as possible. The correction value may be calculated by simulation models, in particular by finite element calculations.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers | |
|---|---|
| 1 | Wind turbine |
| 2 | Nacelle |
| 3 | Tower |
| 4 | Nacelle housing |
| 5 | Rotor |
| 6 | Rotor hub |
| 7 | Rotor blade |
| 8 | Rotor bearing |
| 9 | Sliding bearing |
| 10 | Radial force |
| 11 | Axial force |
| 12 | Tilting torque |
| 13 | Inner ring element |
| 14 | Outer ring element |
| 15 | Sliding bearing element |
| 16 | Rotor shaft |
| 17 | Bearing block |
| 18 | Bearing block base |
| 19 | Bearing block cover |
| 20 | Sliding bearing pad |
| 21 | Rotor axis |
| 22 | Connecting element |
| 23 | Bearing surface |
| 24 | Counterface |
| 25 | Inside |
| 26 | First end face |
| 27 | First diameter |
| 28 | Second end face |
| 29 | Second diameter |
| 30 | Shaped element |
| 31 | Mating shaped element |
| 32 | Axial bearing ring |
| 33 | Axial sliding surface |
| 34 | Axial counter-sliding surface |
| 35 | Fastening means |
| 36 | Circumferential sides |
| 37 | Gap |
| 38 | Fastening groove |
| 39 | Fastening wedge |
| 40 | Adjusting means |
| 41 | Fastening means |
| 42 | Load transfer zone |
| 43 | Shear center |
| 44 | Main direction of force |
| 45 | Recess |
| 46 | Stiffening |
| 47 | Driving recess |
| 48 | Sealing ring |
| 49 | First labyrinth seal |
| 50 | Second labyrinth seal |
| 51 | Lubricating oil |

The invention claimed is:

1. A sliding bearing comprising:
an inner ring element;
an outer ring element;
at least one sliding bearing element, which is arranged between the inner ring element and the outer ring element,
wherein the sliding bearing element comprises at least two sliding bearing pads, wherein the individual sliding bearing pads each have a bearing surface, which has the basic shape of a spherical cap,
wherein the bearing surface cooperates with the outer ring element, and a counterface to the bearing surface is formed in the outer ring element, and the outer ring element is configured as a bearing block which comprises a bearing block base and a bearing block cover,
wherein at least individual ones of the sliding bearing pads are coupled to the inner ring element by fastening screws, wherein threaded holes are arranged in the inner ring element and wherein through holes are formed in the sliding bearing pads through which the fastening screws engage in the threaded holes.

2. The sliding bearing according to claim 1, wherein the inner ring element has a shaped element, wherein the sliding bearing pads have a mating shaped element corresponding to the shaped element, such that the shaped element serves as an axial securing means for the sliding bearing pads.

3. The sliding bearing according to claim 2, wherein the shaped element arranged on the inner ring element is configured in the form of a circumferential bead with a rectangular cross-section, wherein the sliding bearing pads comprise a corresponding groove extending in the circumferential direction.

4. The sliding bearing according to claim 1, wherein at least individual ones of the sliding bearing pads are coupled to one another by a connecting element.

5. The sliding bearing according to claim 4, wherein the connecting element is arranged on a circumferential side of the sliding bearing pads.

6. The sliding bearing according to claim 4, wherein the connecting element comprises at least one fastening wedge, wherein a fastening groove corresponding to the fastening wedge is formed in the sliding bearing pad.

7. The sliding bearing according to claim 4, wherein the connecting element comprises an adjusting means, such that the distance to one another of two sliding bearing pads coupled to one another by the connecting element may be adjusted.

8. The sliding bearing according to claim 1, wherein the bearing surface has a spherical cap formed in such a way that the bearing surface has a first diameter in the region of a first end face of the sliding bearing pad and that the bearing surface has a second diameter in the region of a second end face of the sliding bearing pad, wherein the first diameter is smaller than the second diameter and wherein the second diameter forms the largest diameter on the bearing surface.

9. The sliding bearing according to claim 8, wherein an axial bearing ring is formed which is coupled to the outer ring element, wherein an axial sliding surface is formed on the sliding bearing pads, wherein an axial counter-sliding surface, which corresponds to the axial sliding surface, is formed on the axial bearing ring.

10. The sliding bearing according to claim 9, wherein a first labyrinth seal is formed in the axial bearing ring and/or wherein a second labyrinth seal is formed in a sealing ring.

11. The sliding bearing according to claim 1, wherein the outer ring element comprises a recess and/or a stiffening which serves to change the position of a shear center of the outer ring element.

12. The sliding bearing according to claim 1, wherein the counterface of the outer ring element and/or the bearing surfaces of the sliding bearing pads have a shape deviating from an ideal spherical cap by between 0.001 mm and 10 mm, which shape is configured such that load-induced deformations of the inner ring element and/or the outer ring element and/or the sliding bearing pad are compensated and, in the loaded state, the bearing surfaces of the sliding bearing pads lie flat against the counterface of the outer ring element.

13. The sliding bearing according to claim 1, wherein at least one driving recess for conveying lubricating oil is formed on the bearing surface of at least one of the sliding bearing pads.

14. A nacelle for a wind turbine, the nacelle comprising:
a nacelle housing;
a rotor shaft;
a rotor hub which is arranged on the rotor shaft;

a rotor bearing for bearing the rotor shaft on the nacelle housing, wherein the rotor bearing comprises the sliding bearing according to claim 1.

15. The nacelle according to claim 14, wherein the rotor shaft forms the inner ring element.

16. The nacelle according to claim 14, wherein the bearing surface is configured in the form of a spherical cap in such a way that the bearing surface has a first diameter in the region of a first end face of the sliding bearing pad and that the bearing surface has a second diameter in the region of a second end face of the sliding bearing pad, wherein the first diameter is smaller than the second diameter and wherein the second diameter forms the largest diameter on the bearing surface, wherein the second end face faces a rotor hub.

17. A wind turbine having a nacelle, the nacelle comprising:
- a nacelle housing;
- a rotor hub with rotor blades arranged thereon;
- a rotor bearing for bearing the rotor hub on the nacelle housing, wherein the rotor bearing comprises the sliding bearing according to claim 1.

18. The wind turbine according to claim 17, wherein the outer ring element has a shear center, wherein the sliding bearing pad has a first end face and a second end face, wherein the sliding bearing pad acts on the outer ring element in a main direction of force, wherein the main direction of force acts closer to the second end face of the sliding bearing pad than where the shear center is formed.

19. The sliding bearing according to claim 1, wherein the sliding bearing is formed as a hydrodynamic sliding bearing.

20. The sliding bearing according to claim 19, wherein the bearing block base and the bearing block cover are divided such that a separation gap between the bearing block base and the bearing block cover is arranged at a distance from a load transfer zone.

21. A sliding bearing comprising:
- an inner ring element;
- an outer ring element;
- at least one sliding bearing element, which is arranged between the inner ring element and the outer ring element,
- wherein the sliding bearing element comprises at least two sliding bearing pads, wherein the individual sliding bearing pads each have a bearing surface, which has the basic shape of a spherical cap,
- wherein at least individual ones of the sliding bearing pads are coupled to the inner ring element by fastening screws, wherein threaded holes are arranged in the inner ring element and wherein through holes are formed in the sliding bearing pads through which the fastening screws engage in the threaded holes.

22. A sliding bearing comprising:
- an inner ring element;
- an outer ring element;
- at least one sliding bearing element, which is arranged between the inner ring element and the outer ring element,
- wherein the sliding bearing element comprises at least two sliding bearing pads, wherein the individual sliding bearing pads each have a bearing surface, which has the basic shape of a spherical cap,
- wherein the bearing surface cooperates with the outer ring element, and a counterface to the bearing surface is formed in the outer ring element, and the outer ring element is configured as a bearing block which comprises a bearing block base and a bearing block cover,
- wherein the bearing block base and the bearing block cover are divided such that a separation gap between the bearing block base and the bearing block cover is arranged at a distance from a load transfer zone such that the counterface in the region of the load transfer zone does not have a gap.

23. A sliding bearing comprising:
- an inner ring element;
- an outer ring element;
- at least one sliding bearing element, which is arranged between the inner ring element and the outer ring element,
- wherein the sliding bearing element comprises at least two sliding bearing pads, wherein the individual sliding bearing pads each have a bearing surface, which has the basic shape of a spherical cap,
- wherein the bearing surface cooperates with the outer ring element, and a counterface to the bearing surface is formed in the outer ring element, and the outer ring element is configured as a bearing block which comprises a bearing block base and a bearing block cover,
- wherein the counterface is integrated in the bearing block base and the bearing block cover and is divided by a separation gap between the bearing block base and the bearing block cover.

* * * * *